United States Patent Office 3,634,585
Patented Jan. 11, 1972

3,634,585
DENTIFRICE PREPARATION
Roderick David Manahan, Dunellen, and Virgil John Richter, West Orange, N.J., assignors to Colgate-Palmolive Company, New York, N.Y.
No Drawing. Continuation of application Ser. No. 377,519, June 24, 1964, which is a continuation-in-part of application Ser. No. 238,017, Nov. 15, 1962. This application Aug. 11, 1966, Ser. No. 571,693
Int. Cl. A61k 7/16
U.S. Cl. 424—52                              4 Claims

ABSTRACT OF THE DISCLOSURE

A dentifrice preparation containing sodium monofluorophosphate and a compatible polishing agent at least a major part by weight of which is dicalcium phosphate. A minor part by weight of the polishing agent may be calcium carbonate.

---

This application is a continuation of application Ser. No. 377,519 filed June 24, 1964, now abandoned, which is a continuation-in-part of application Ser. No. 238,017 filed Nov. 15, 1962, now abandoned.

The present invention relates to a dentifrice preparation comprising sodium monofluorophosphate and a polishing material containing at least a major portion of dicalcium phosphate, as hereinafter described.

Certain fluoride compounds have been used as additives to drinking water or for topical application on the teeth in the form of an aqueous solution. By such application, it is believed generally that the fluoride renders the tooth structure more resistant to the effect of acid in the mouth.

It has been proposed that fluoride compounds be incorporated in dentifrices. Enamel solubility tests have shown that the effectiveness of water-soluble fluorides such as sodium fluoride is diminished when used in the presence of certain dentifrice constituents such as calcium carbonate, dicalcium phosphate or similar materials as shown by Bibby, The Journal of the American Dental Association, vol. 34, Jan. 14, 1947, pages 26–32. It has been found that such calcium-containing phosphates, e.g. di- and tri-calcium orthophosphates, remove the soluble fluoride from solution as described by MacIntire et al. and Adler et al. in Industrial and Engineering Chemistry, vol. 34, pages 160–162 and pages 163–165 respectively. It has been shown furthermore that the heat-treatment of such calcium-containing phosphates, e.g. about 500° C. for 15 to 30 minutes, results in a product which has substantially less adsorptive capacity for soluble fluoride, as shown for example by Current Science of India, November 1951, pages 293–4.

Various complex fluoride compounds have been examined in preliminary screening tests in laboratory involving in vitro or animal studies of their relative effectiveness for possible anticariogenic ability, particularly in comparison to fluorides such as sodium fluoride and stannous fluoride. Among the complex fluorine-containing materials subjected to such tests were certain fluorosilicates and fluorophosphates. As early as 1950, sodium monofluorophosphate was subjected to such tests and, in general, reported to have an effect comparable to sodium fluoride by Shourie, et al. in The Journal of Dental Research, 1950, pages 529–533 and a number of publications thereafter. During 1954 to 1957, certain data was published indicating the relative ineffectiveness of sodium monofluorophosphate. In The Journal of Dental Research, October 1954, page 676, it was reported that dental caries studies on animals disclosed that sodium hexfluorophosphate was effective and sodium monofluorophosphate was ineffective in the inhibition of dental caries. It was further reported that sodium monofluorophosphate was essentially ineffective on certain tooth structure in The Journal of Dental Research, February 1956, pages 59–64, and in The Journal of Dental Research, 1957, pages 889–894.

There are a number of factors involved in the development of an effective dentifrice, even after the selection for possible use in a dentifrice of an anti-decay agent which has shown great effectiveness as such in vitro and animal studies. Some of the factors involved in the laboratory evaluation of potential anti-caries agents in dentifrices generally are disclosed in The Journal of the Society of Cosmetic Chemists, vol. 7, 1956, pages 434–443. It has also been reported that various detergents inhibit or interfere with the action of fluoride salts when applied to enamel in vitro, as disclosed in The Journal of Dental Research, October 1953, page 703, No. 170.

The dentifrice preparations of the present invention exhibit superior characteristics for the care and hygiene of the mouth and teeth. They are effective anti-decay agents and possess superior cosmetic qualities also. They exhibit particularly desirable anti-decay characteristics in comparison to dentifrices containing soluble fluorides such as sodium fluoride or stannous fluoride in admixture with dicalcium phosphate for example. The dentifrices of the present invention are effective in inhibiting the solubility of tooth enamel in acid solution. The fluorine in the present compositions is maintained in soluble form for a comparatively long period of time. The present dental creams have a smooth texture and superior cleansing characteristics, whereas dental creams having calcium carbonate as the abrasive material are comparatively rubbery and grainy in texture, and exhibit a slimy and slippery feel during brushing and thus markedly inferior in consumer acceptability.

In accordance with certain of its aspects, this invention relates to a dentifrice preparation which comprises about 0.05% to about 7.6% by weight of sodium monofluorophosphate and compatible polishing material at least a major part of which is dicalcium phosphate, said polishing material being about 20–99% by weight of said dentifrice preparation.

The sodium monofluorophosphate ($Na_2PO_3F$) is a water-soluble material which releases monofluorophosphate ions in water, and it may be mixed with the polishing material in any suitable amount. Such dental preparation is compatible with suitable amounts of surface-active agents, gum, etc., as described. The sodium monofluorophosphate as commercially available may vary considerably in purity. It may be used in any suitable purity provided that any impurities do not substantially adversely affect the desired properties. In general, the purity is desirably at least about 80%. For best results, it should be at least 85%, and preferably at least 90% by weight of sodium monofluorophosphate with the balance being primarily impurities or by-products of manufacture such as sodium fluoride, water-soluble sodium phosphate salt, and the like. Expressed in another way, the sodium monofluorophosphate employed should have a total fluoride content of above 12%, preferably above 12.7%; a content of not more than 1.5%, preferably not more than 1.2% of free sodium fluoride; and a sodium monofluorophosphate content of at least 12%, preferably at least 12.1%, all calculated as fluorine.

The proportion of sodium monofluorophosphate in the dentifrice may be varied but should be an effective, non-toxic amount containing above 0.01% fluorine (100 p.p.m.). Suitable amounts are selected within the range of about 0.05% to a maximum of about 7.6% by weight. It is preferred that the sodium fluorophosphate salt be no more than 2%, and usually within the range of 0.05% to about 1%, by weight of the dentifrice.

The polishing material contains at least a major proportion of dicalcium phosphate, typically at least partially hydrated dicalcium phosphate, and preferably dicalcium phosphate dihydrate. Other suitable dicalcium phosphates may be used, including dicalcium phosphate in anhydrous form and the like. The dicalcium phosphate may be used singly as the sole polishing agent. It may also be used in combination with other polishing agents as the major ingredient (more than 50% by weight) of the polishing material. The dicalcium phosphate may be considered as partially hydrated such as in a mixture of the dicalcium phosphate dihydrate and anhydrous dicalcium phosphate in any suitable ratio resulting from a blend or formed in situ in the manufacture of the dicalcium phosphate. A special feature of the present invention is that calcium carbonate such as natural chalk and preferably precipitated calcium carbonate is used in minor proportion (i.e. less than 50% by weight) of the polishing material, the dicalcium phosphate and calcium carbonate being the only polishing agents present. These polishing materials are employed in finely powdered form of any suitable particle size for effective polishing power.

In the case of the dicalcium phosphate and calcium carbonate mixtures, the ratio of these materials is variable and should be preferably from the range of about 99:1 to about 65:35 by weight, and usually about 25:1 to 3:1, depending upon the effects desired and the particular calcium phosphate and carbonate used. In general, it is preferred to prepare dental creams having 40-60% polishing material with dicalcium phosphate as the main polishing ingredient and from 1 to 15% calcium carbonate in the dental cream. Other polishing materials may be added in suitable amount if desired such as alumina, calcium pyrophosphate, tricalcium phosphate, calcium polymetaphosphate and the like. The total content of polishing agents will be usually at least 20%, such as about 20-99% and particularly from 20-75%, preferably 40-60%, in toothpastes and at least 70% in tooth powders.

Any suitable surface active or detersive material may be included in the dentifrice compositions. Such compatible materials are desirable to provide additional detersive, foaming and antibacterial properties depending upon the specific type of surface active material and are selected similarly. These detergents are water-soluble organic compounds usually, and may be anionic, non-ionic or cationic in structure. It is preferred to use the water-soluble salts of higher fatty acid monoglyceride monosulfate detergent (e.g. sodium coconut fatty acid monoglyceride monosulfate), higher alkyl sulfate (e.g. sodium lauryl sulfate), alkyl aryl sulfonate (e.g. sodium dodecyl benzene sulfonate) higher fatty acid esters of 1,2 dihydroxy propane sulfonate (e.g. sodium coconut fatty acid ester of 1,2 dihydroxy propane sulfonate), and the like.

The various surface active materials may be used in any suitable amount, generally from about 0.05 to about 10% by weight, and preferably from about 0.5 to 5% by weight of the dentifrice composition.

It is a further embodiment of the present invention to use the substantially saturated higher aliphatic acyl amides of lower aliphatic amino carboxylic acid compounds, such as those having 12 to 16 carbons in the acyl radical, and as more particularly described in U.S. Pat. 2,689,170, issued Sept. 14, 1954. The amino acid portion is derived generally from the lower aliphatic saturated monoaminocarboxylic acids having about 2 to 6 carbons, usually the monocarboxylic acid compounds. Suitable compounds are the fatty acid amines of glycine, sarcosine, alanine, 3-amino propanoic acid and valine having about 12 to 16 carbons in the acyl group. It is preferred to use the N-lauroyl, myristoyl and palmitoyl sarcoside compounds however for optimum effects.

The amide compounds may be employed in the form of the free acid or preferably as the water-soluble salts thereof, such as the alkali metal, ammonium, amine and alkoylamine salts. Specific examples thereof are sodium and potassium N-lauroyl, myristoyl and palmitoyl sarcosides, ammonium and ethanolamine N-lauroyl sarcosides and N-lauroyl sarcosine, and sodium N-lauroyl glycide and alanide. For convenience herein, reference to "amino carboxylic acid compound," "sarcoside," and the like refers to such compounds having a free carboxylic group or the water-soluble carboxylate salts.

Such materials are utilized in pure or substantially pure form. They should be as free as practicable from soap or similar higher fatty acid material which tends to reduce the activity of these compounds. In usual practice, the amount of such higher fatty acid material is less than 15% by weight of the amide and insufficient to substantially adversely affect it, and preferably less than about 10% of said amide material.

In accordance with the present invention, the specified combinations of ingredients may be used in any suitable preparation designed for application to the oral cavity which preparation is referred to herein as a dentifrice preparation. Such dentifrices may be in solid, liquid or paste form and include tooth pastes or dental creams, tooth powders, liquid dentifrices, tablets and the like. Such products are prepared in the usual manner. In the preparation of tooth powders, it is usually sufficient to mechanically admix the various solid ingredients.

In dental cream formulations, the liquids and solids should necessarily be proportioned to form a creamy mass of desired consistency which is extrudible from a collapsible aluminum or lead tube for example. In general, the liquids in the dental cream will comprise chiefly water, glycerine, sorbitol, propylene glycol, or the like, including suitable mixtures thereof. It is advantageous usually to use a mixture of both water, and a humectant or binder such as glycerine, sorbitol or mixtures thereof. The total liquid content will generally be about 20-75% by weight of the formulation. It is preferred to use also a gelling agent in dental creams such as the natural and synthetic gums and gumlike materials, e.g. Irish Moss, gum tragacanth, sodium carboxymethylcellulose, polyvinylpyrrolidone, starch and the like. The Irish Moss and sodium carboxymethylcellulose are compatible particularly and are preferred gelling agents. The gum content is usually in an amount up to about 10% and preferably about 0.5–5% by weight of the formulation.

Other types of dentifrice compositions will be formulated in known manner also.

A minor amount of hydrated aluminum oxide may be incorporated in the dentifrice preparation. More particularly, a dental cream having improved physical properties may be prepared from a mixture of the dicalcium phosphate dihydrate with a minor amount of calcium carbonate or anhydrous dicalcium phosphate suspended in a gel comprising water, humectant and gelling agent, with said monofluorophosphate compound and organic non-soap synthetic detergent, and preferably a minor amount of hydrated aluminum oxide. These dental creams exhibit a superior degree of cosmetic properties and physical stability to aging for long periods of time. The aluminum oxide acts as a stabilizing and modifying agent so as to eliminate or inhibit any tendency for separation or "bleeding" of the dental cream in the collapsible tube.

Suitable examples of hydrated aluminum oxide which may be employed are the forms known as alpha and beta aluminum oxide trihydrate and mixtures thereof. It is used usually in the form of fine particles of any desired particles size in the manufacture of the dental cream. In practice, it is preferred to use the alpha trihydrate form of which at least about 90% of the particles pass through on a U.S. standard No. 325 mesh sieve and not more than about 5% of the particles by weight are less than 5 microns. It has been found that amounts of hydrated aluminum oxide from about ¼ to about 10% by weight are most desirable. The dental creams may have any pH practicable for use. If necessary, acidifying agents or basic materials may be added to adjust the pH as desired. For example, a suitable acidifying agent such as citric acid or other weak organic acid may be employed in varying amount if necessary to adjust the pH of the dental cream.

There may be employed also various calcium and magnesium ion suppression agents for adjustment of physical properties of the compositions. Suitable agents are the water-soluble inorganic polyphosphate salts, such as tetrasodium pyrophosphate or disodium diacid pyrophosphate, with the partially neutralized or acid polyphosphate preferred. Other suitable agents are the alkali metal, preferably sodium, salts of citric acid. In general, such compounds will be a minor amount or proportion of the formulation. The precise amount will vary depending upon the specific formulation, such as the physical characteristics of the dental cream, but will usually be from about 0.1% to about 3% by weight.

The following specific examples are further illustrative of the nature of the present invention, but it is to be understood that the invention is not limited thereto. The composiions are prepared in the usual manner and all amounts of the various ingredients are by weight unless otherwise specified.

EXAMPLES I AND II.—DENTAL CREAMS

| Ingredients | I, percent | II, percent |
| --- | --- | --- |
| Sodium monofluorophosphate | 0.76 | 0.76 |
| Sodium N-lauroyl sarcosinate | 2.0 | 2.0 |
| Dicalcium phosphate dihydrate | 46.8 | 43.8 |
| Calcium carbonate | 5.0 | 5.0 |
| Glycerine | 25.6 | 24.0 |
| Sodium carboxymethylcellulose | 0.8–1 | 0.8–1 |
| Water (with very small amounts of soluble saccharin, preservative, flavor, color as desired) | (¹) | (¹) |

¹ Balance.

These dental creams in use have effective anti-decay properties and superior cosmetic qualities. The pH of the dental cream is substantially neutral, i.e. about 7. The calcium carbonate may be replaced in part or whole by anhydrous dicalcium phosphate to form satisfactory dental creams also.

EXAMPLE III.—TOOTH POWDER

Ingredients: Percent
Sodium N-lauroyl sarcosinate and/or lauryl sulfate _____ 3.0
Sodium monofluorophosphate _____ 1.0
Dicalcium phosphate dihydrate _____ 70.0
Calcium carbonate _____ 24.0
Soluble saccharin and flavor _____ 2.0

Various other materials may be incorporated in such dentifrice preparations. Added materials in the formulation may be suitably selected and used in proper amount depending upon the particular type of preparation. Such materials as soluble saccharin, flavoring oils (e.g. oils of spearmint, peppermint, wintergreen), coloring or whitening agents (e.g. titanium dioxide), preservative (e.g. sodium benzoate), emulsifying agents, silicones, alcohol, menthol, chlorophyll compounds (e.g. sodium copper chlorophyllin), and the like may be used.

Although the present invention has been described with reference to particular embodiments and examples, it will be apparent to those skilled in the art that variations and modifications of this invention can be made and that equivalents can be substituted therefor without departing from the principles and true spirit of the invention.

We claim:
1. A dentifrice preparation which comprises about 0.05% to about 7.6% by weight of sodium monofluorophosphate and a compatible polishing material consisting essentially of a mixture of dicalcium phosphate and calcium carbonate, the ratio of said dicalcium phosphate to said calcium carbonate being from about 99:1 to about 65:35 by weight.

2. A dentifrice preparation in accordance with claim 1 wherein a water soluble organic synthetic detergent is present.

3. A dentifrice preparation in the form of a dental cream comprising 0.05–2% by weight of sodium monofluorophosphate and a polishing material comprising a mixture of dicalcium phosphate and calcium carbonate as the only polishing agents and and in a ratio of from about 25:1 to 3:1 by weight; said polishing agent being about 20–75% by weight of said dental preparation.

4. A dentifrice in the form of a dental cream preparation in accordance with claim 3 in which 0.5–5% by weight of an alkali metal N-saturated fatty acyl sarcosinate salt having 12 to 16 carbons in the acyl radical is present.

References Cited

UNITED STATES PATENTS

| | | | |
| --- | --- | --- | --- |
| 2,806,814 | 9/1957 | Richter | 167—93 |
| 2,955,985 | 10/1960 | Kuna | 167—93 F |
| 3,119,743 | 1/1964 | Ericson | 167—93 F |
| 3,227,618 | 1/1966 | Manahan et al. | 167—93 F |
| 3,308,029 | 3/1967 | Saunders et al. | 167—93 |

FOREIGN PATENTS

| | | | |
| --- | --- | --- | --- |
| 1,124,756 | 10/1958 | France | 167—93 F |

RICHARD L. HUFF, Primary Examiner